United States Patent [19]
Shurtz, II

[11] Patent Number: 5,301,009
[45] Date of Patent: Apr. 5, 1994

[54] FRUSTRATED TOTAL INTERNAL REFLECTION OPTICAL POWER LIMITER

[75] Inventor: Richard R. Shurtz, II, Oakton, Va.

[73] Assignee: The United States of America as represented by the Secretary of the Army, Washington, D.C.

[21] Appl. No.: 492,062

[22] Filed: Apr. 28, 1983

[51] Int. Cl.⁵ .................. H01S 3/02; G02B 27/28
[52] U.S. Cl. ........................ 359/487; 359/485
[58] Field of Search .............. 330/4.3; 332/7.51; 372/991; 350/163, 352, 6.4, 267, 485, 487, 353, 363; 359/485, 487

[56] References Cited

U.S. PATENT DOCUMENTS

| | | | |
|---|---|---|---|
| B 527,669 | 1/1976 | Paulsen | 372/99 |
| 2,240,988 | 5/1941 | Hertel | 350/312 |
| 3,213,752 | 10/1965 | Ruderman | 350/163 |
| 3,267,807 | 8/1966 | Swope et al. | 350/163 |
| 3,301,624 | 1/1967 | Morriss | 350/163 |
| 3,492,062 | 1/1970 | Hoover | 332/7.51 |
| 3,602,576 | 8/1971 | Kohler et al. | 350/163 |
| 3,612,653 | 10/1971 | Rajchman | 350/363 |
| 3,614,211 | 10/1971 | Letter | 350/312 |
| 3,792,916 | 2/1974 | Sarna | 350/163 |
| 3,834,795 | 9/1974 | Erichsen et al. | 350/485 |
| 3,967,582 | 7/1976 | Roberts et al. | 332/7.51 |
| 3,982,206 | 9/1976 | Poulsen | 350/363 |
| 3,985,426 | 10/1976 | McNaney | 332/7.51 |
| 3,985,428 | 10/1976 | McNaney | 332/7.51 |
| 4,009,453 | 2/1977 | Mahlein | 372/99 |
| 4,322,979 | 4/1982 | Fromm | 350/485 |

FOREIGN PATENT DOCUMENTS 0020217 5/1979 European Pat. Off. ......... 350/163
2803489 8/1989 Fed. Rep. of Germany ...... 350/485

OTHER PUBLICATIONS

Hayes, "Laser Safety System", Feb. 1972, pp. 2776-2771 IBM Tech. Disc. Bull., vol. 14, #9.
Leeb, "Variable Beam Attenuator for 10.6 μm", May 1976, pp. 553-555, Rev. of Sci. Inst., vol. 47, #5.
Taylor, "Liquid Evaporator Light Deflector", Mar. 1972, pp. 586-593, Appl. Opt., vol. 11, #3.

*Primary Examiner*—Nelson Moskowitz
*Attorney, Agent, or Firm*—Milton W. Lee; Aubrey J. Dunn; Robert P. Gibson

[57] ABSTRACT

In order to protect a delicate photo-detector from high-intensity optical radiation such as from a laser, a device for limiting power to the detector is interposed between the radiation and detector. This device has two embodiments and is made such that high-intensity radiation is totally reflected. In the absence of high-intensity radiation, total reflection is frustrated, and desired radiation passes to the detector. Both embodiments use two prisms with parallel surfaces skewed to incident radiation and with a slightly absorbant optical material between the surfaces. Desired radiation normally passes through the prisms and the material to the detector. In one embodiment, the material is a liquid which vaporizes in response to high-intensity radiation, and in the other embodiment, the material expands and pushes the prisms apart. In either case, transmission of radiation halts, and the radiation is totally reflected by a prism skewed surface.

7 Claims, 2 Drawing Sheets

FRUSTRATED TOTAL INTERNAL REFLECTION OPTICAL POWER LIMITER

The invention described herein may be manufactured, used and licensed by the U.S. Government for governmental purposes without the payment of any royalties thereon.

BACKGROUND OF THE INVENTION

This invention is in the field of protective devices for photo-detectors, and is particularly concerned with protecting such detectors against laser countermeasures. The types of detectors being protected include image intensifiers, television camera tubes, infrared detectors, and the human eye. Of these, the human eye requires the greatest protection because of its low damage threshold. Various techniques have been used and suggested for use against laser (or other possibly damaging radiations, such as sunlight). The main techniques used are fast-acting shutters (mechanical or electro-optical) and interference filters (absorbing or reflecting).

Unfortunately, these techniques have disadvantages which make them unusable for some detectors. Specifically, shutters require relatively long times to open and close, compared to the rise time of a pulsed laser. Interference filters, in order to block the spectra of various lasers, must be individually made for each threatening laser, and stacked in front of the detector being protected. For detection of low-level light, such stacked filters present unacceptable attenuations. The instant invention overcomes these disadvantages; it is fast acting and relatively non-attenuating in its unactivated mode.

SUMMARY OF THE INVENTION

The invention is a device for diverting high-intensity optical radiation away from a sensitive detector. The device includes an optical interface able to totally reflect such radiation, but to transmit freely desired radiation. One embodiment of the invention employs two prisms arranged adjacent to each other, and with corresponding inclined surfaced parallel. Between the parallel surfaces, a liquid capable of partially absorbing incoming radiation is contained; high intensity radiation will cause vaporization of the liquid in the region of high intensity. The device thus no longer transmits radiation to a detector but reflects it to an absorber. Another embodiment of the invention uses a gas which, when heated by absorbing high-intensity radiation, expands and pushes the prisms apart such that a gap of sufficient width to prevent evanescent coupling of radiation between the prisms is established. The radiation is thus reflected away from the detector.

DESCRIPTION OF PREFERRED EMBODIMENTS

Figure 1A:
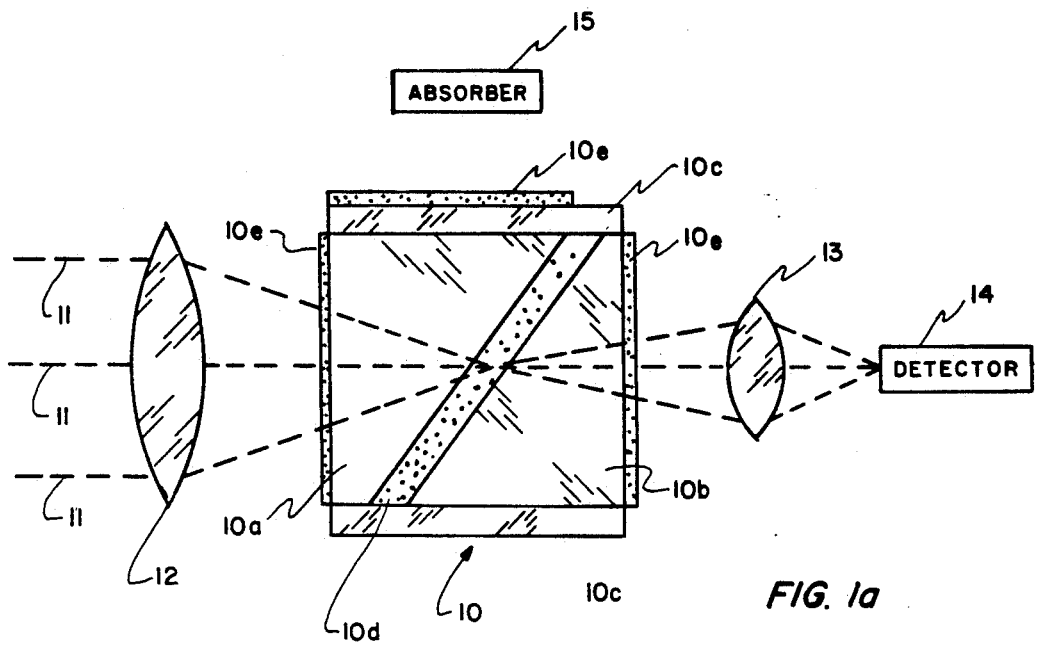
FIG. 1a is a schematic showing of one embodiment of the invention, for normal radiation.

The invention may be best understood when this description is taken in conjunction with the drawings. In the drawings, FIG. 1a schematically shows an embodiment of the invention with the inventive device generally designated 10. This device is not shown to scale, but various dimensions have been exaggerated for illustration purposes. The device includes first and second optical prisms 10a and 10b held fixed with respect to each other by transparent material 10c. Between 10a and 10b is liquid 10d; this liquid is slightly absorbent to incident radiation shown as rays 11. As shown in the figure, this radiation is focussed onto liquid 10d by lens 12, and passes on to lens 13, which lens focusses the radiation onto detector 14. This is for the case when radiation 11 is of a relatively low intensity (i.e., it will not damage detector 14); essentially no radiation is diverted to radiation absorber 15. Device 10 may be coated with various antireflection layers 10c, in the usual manner. In order for radiation to freely pass through device 10 as shown, the refractive index of 10d must be matched to that of prisms 10a and 10b; the gap width between 10a and 10b as determined by 10d is therefore not critical, but much larger than the distance required for evanescent mode coupling. Liquid 10d should absorb no more than 10% of the radiation. Moreover, the prisms must have angles $\theta$ such that the angle of incident radiation is greater than the critical angle for total internal reflection.

Figure 1B:
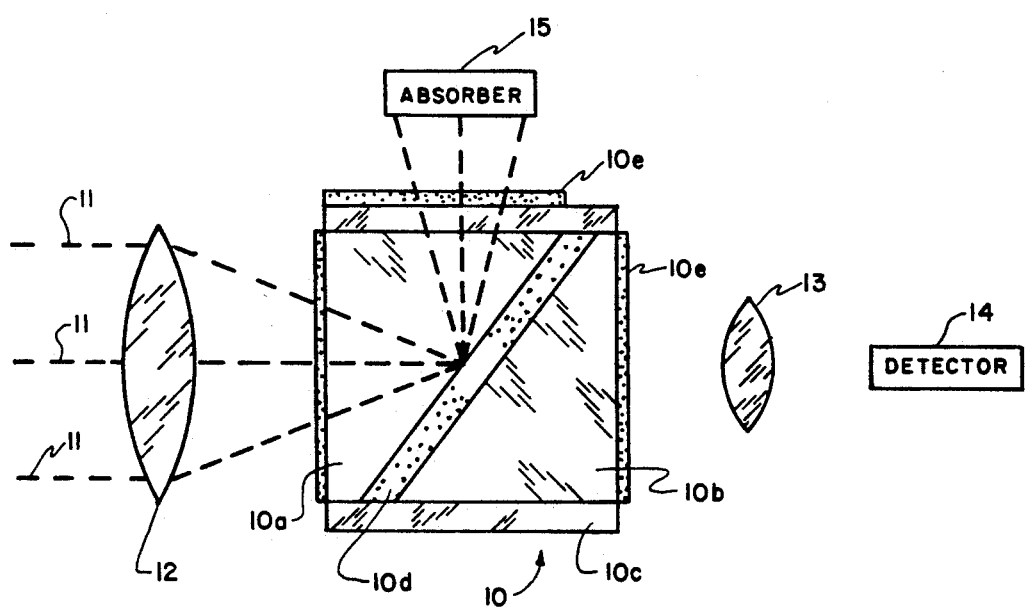
FIG. 1b is the embodiment of FIG. 1a for high-intensity radiation.

When high-intensity light radiation, as from a laser, is focussed into 10 as shown in FIG. 1b, liquid 10d rapidly absorbs sufficient energy therefrom to boil. The transmission through 10 is thus defeated, the radiation is totally reflected at the skewed surface of prism 10a, and is directed out of device 10 onto absorber 15.

Figure 2A:
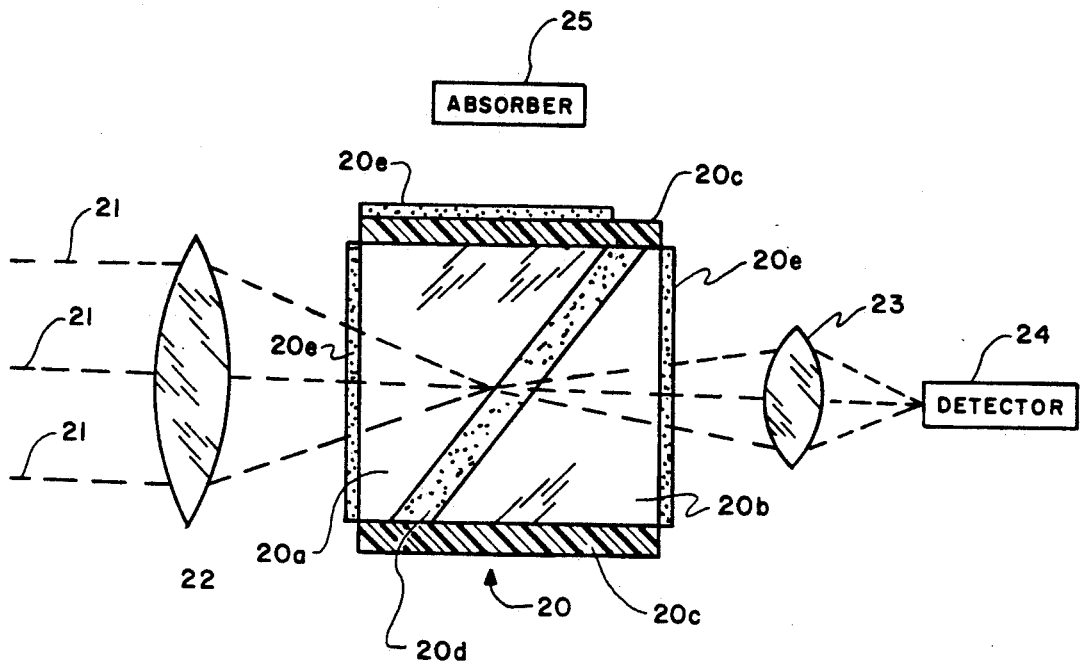
FIG. 2a is a schematic showing of a second embodiment of the invention, for normal radiation.
Figure 2B:
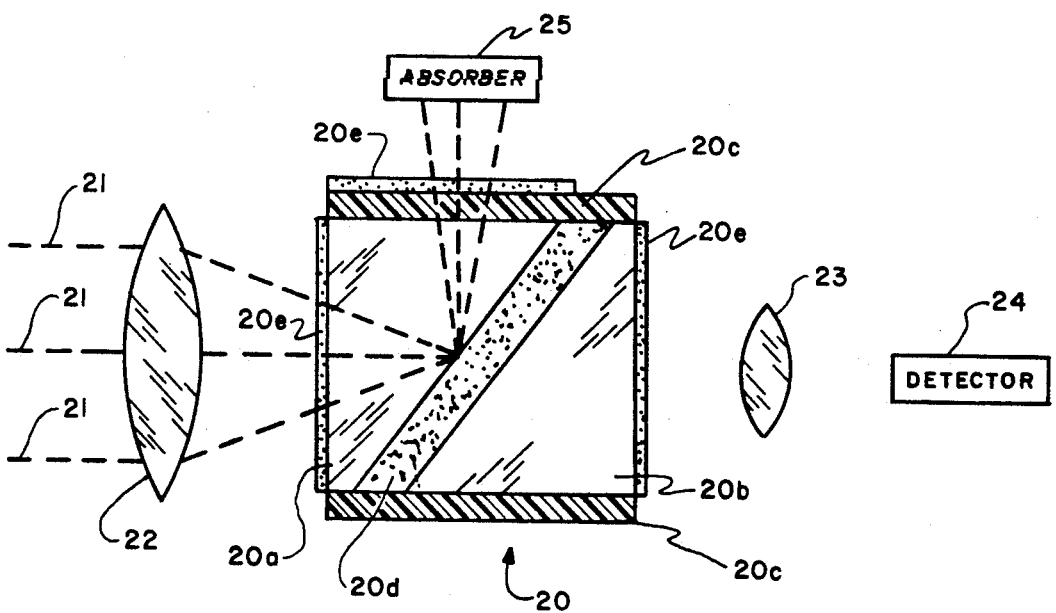
FIG. 2b is the embodiment of FIG. 2a for high-intensity radiation.

The embodiment of the invention as shown in FIGS. 2a and 2b is similar in some aspects to the FIGS. 1a and 1b embodiment. Specifically, FIG. 2a shows numerals 20–25 corresponding to numerals 10–15 of FIG. 1a. Device 20 of FIG. 2a includes prisms 20a and 20b held together by material 20c, and with material 20d between 20a and 20b. Material 20d is a gas slightly absorbent to incident radiation 21, and of thickness (less than a wavelength of incident radiation) to provide efficient evanescent coupling between 20a and 20b. Normal (low intensity radiation) 21 essentially passes freely through device 10 and falls on detector 24.

In the event that high-intensity radiation is directed into device 20, changes occur as shown in FIG. 2b. In this figure, high intensity radiation 21 is absorbed by gas 20d, the gas expands and destroys the evanescent coupling, and total reflection occurs at the 20a–20d interface. Radiation 21 is thus diverted away from detector 24 and onto absorber 25. Obviously, material 20c must be sufficiently elastic to allow the expansion of 20d, and antireflective layer 20e on 20c must also be elastic. If desired, prisms 20a and 20b and material 20d might be slidably held in 20c rather than fixed thereto and spring biased towards each other, in which case 20c need not be elastic. The various comments about prism angles, etc. as set forth above for device 10 also apply to device 20.

It should be remembered that high-intensity and low-intensity radiation may be simultaneously incident on devices 10 or 20. As long as the high-intensity radiation occurs, 10 or 20 will divert it (and any accompanying low-intensity radiation) into an absorber; with the cessation of the high-intensity radiation, the normal low-intensity radiation will again pass through 10 or 20 to the detector.

Materials which may be used for 10d in FIGS. 1a and 1b include the following liquids: methanol, ethanol, carbon disulfide, or any high vapor pressure substance. It also might be advantageous to have small carbon particles in suspension in the liquid, in order to enhance radiation absorption.

For FIGS. 2a and 2b, gases such as $CO_2$, $SF_6$, Ne, or Ar may be used for 20d.

I claim:

1. A device for protecting a photo-detector for relatively low-power light radiation from high-intensity light radiation, wherein the device is positioned on an optical axis between said detector and incident radiation, and the device includes:

a pair of optical prisms having a first pair of parallel sides normal to said optical axis, and a second pair of parallel sides adjacent to each other and skewed with respect to said optical axis; and an optical material between said second pair of sides responsive to the intensity of the radiation on said optical axis to cause diversion of said axis for high-intensity radiation.

2. The device as set forth in claim 1 wherein the skewed sides of the prisms are at an angle greater than the critical angle.

3. The device as set forth in claim 2 wherein said material is partially absorbent to said incident radiation.

4. The device as set forth in claim 3 wherein the thickness of said material is normally less than the wavelength of said incident radiation such that evanescent coupling occurs between said prisms.

5. The device as set forth in claim 3 wherein said optical material has substantially the same index of refraction as said prisms and provides a transmission path between said prisms.

6. The device as set forth in claim 4 wherein said material is a gas which expands in response to high-intensity light radiation, whereby said evanescent coupling is defeated, and total reflection of said radiation occurs.

7. The device as set forth in claim 5 wherein said material is a liquid which vaporizes in the region of and responsive to high-intensity light radiation, whereby said transmission path is interrupted, and total reflection of said radiation occurs.

* * * * *